US012678645B2

(12) United States Patent
Kjellman

(10) Patent No.: US 12,678,645 B2
(45) Date of Patent: Jul. 14, 2026

(54) HINGED AXLE PULLEY RELEASE FOR INLINE CABLE FIRE PULL STATION

(71) Applicant: KIDDE-FENWAL, LLC, Ashland, MA (US)

(72) Inventor: Thomas Kjellman, Uxbridge, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 551 days.

(21) Appl. No.: 18/297,765

(22) Filed: Apr. 10, 2023

(65) Prior Publication Data

US 2023/0321472 A1 Oct. 12, 2023

Related U.S. Application Data

(60) Provisional application No. 63/329,740, filed on Apr. 11, 2022.

(51) Int. Cl.

*A62C 35/11* (2006.01)
*A62C 3/00* (2006.01)
*A62C 37/42* (2006.01)
*A62C 37/46* (2006.01)
*A62C 99/00* (2010.01)

(52) U.S. Cl.

CPC .............. *A62C 35/11* (2013.01); *A62C 37/42* (2013.01); *A62C 99/009* (2013.01); *A62C 3/006* (2013.01); *A62C 37/46* (2013.01)

(58) Field of Classification Search

CPC ....... A62C 35/11; A62C 37/42; A62C 99/009; A62C 3/006; A62C 37/46; A62C 2/242; G05G 7/00

USPC ........................................................ 169/5, 65

See application file for complete search history.

(56) References Cited

U.S. PATENT DOCUMENTS

| | | | | |
|---|---|---|---|---|
| 3,378,081 A * | 4/1968 | O'Reilly | A62C 37/42 | 169/17 |
| 3,515,218 A * | 6/1970 | Lastinger | A62C 3/07 | 169/62 |
| 4,773,485 A * | 9/1988 | Silverman | A62C 3/006 | 169/59 |
| 5,127,479 A * | 7/1992 | Stehling | A62C 3/006 | 285/31 |
| 5,297,636 A * | 3/1994 | North | A62C 3/006 | 169/65 |
| 6,286,604 B1 * | 9/2001 | Ou | A62C 37/46 | 169/56 |
| 9,352,176 B2 * | 5/2016 | Erva | G08B 17/00 | |
| 2008/0210443 A1 * | 9/2008 | Erva | A62C 35/023 | 340/286.11 |
| 2015/0231432 A1 * | 8/2015 | Zlatintsis | A62C 37/46 | 169/61 |
| 2020/0338376 A1 * | 10/2020 | Kjellman | A62C 37/42 | |

* cited by examiner

*Primary Examiner* — Kevin Edward Schwartz

(74) *Attorney, Agent, or Firm* — Honigman LLP; Andrew J. Boes

(57) ABSTRACT

A manual activation system includes a bracket rotatable about a first axis between a first configuration and a second configuration and a pulley movable between an inactive position and an active position. The pulley is mounted to the bracket and is rotatable about a second axis. A tension member is wrapped about the pulley and has a tensile force acting on the pulley. An activation member is configured to cooperate with the bracket to selectively oppose the tensile force.

9 Claims, 3 Drawing Sheets

HINGED AXLE PULLEY RELEASE FOR INLINE CABLE FIRE PULL STATION

CROSS-REFERENCE TO RELATED APPLICATIONS

This application claims the benefit of U.S. Application No. 63/329,740, filed Apr. 11, 2022, the contents of which are incorporated by reference herein in their entirety.

BACKGROUND

Embodiments of the present disclosure relate to a system and method for delivering a fire suppression agent to a cooking appliance in the event of a fire, and more particularly to a manually operated pull station for delivering a fire suppression agent through an agent delivery path.

Manual activation systems used in fire suppression systems, such as cable pull stations, are typically simple mechanical mechanisms. Commonly, a pulley is mounted within a housing by a pin. To activate the fire suppression system, the pin is removed from the housing to release the tension in the cable wrapped about the pulley. However, because all of the tension from the cable is acting on the pulley, and therefore on the pin supporting the pulley, a large amount of force is required to remove the pin, making the system difficult for a user to operate.

BRIEF DESCRIPTION

According to an embodiment, a manual activation system for use in a fire suppression system includes a bracket rotatable about a first axis between a first configuration and a second configuration and a pulley movable between an inactive position and an active position. The pulley is mounted to the bracket and is rotatable about a second axis. A tension member is wrapped about the pulley and has a tensile force acting on the pulley. An activation member is configured to cooperate with the bracket to selectively oppose the tensile force.

In addition to one or more of the features described herein, or as an alternative, in further embodiments the first axis is oriented substantially orthogonally to the second axis.

In addition to one or more of the features described herein, or as an alternative, in further embodiments the pulley is mounted concentrically about the bracket.

In addition to one or more of the features described herein, or as an alternative, in further embodiments the pulley has a central hole aligned with the second axis, the bracket being receivable within the central hole.

In addition to one or more of the features described herein, or as an alternative, in further embodiments the pulley is rotatable about the second axis relative to the bracket.

In addition to one or more of the features described herein, or as an alternative, in further embodiments the pulley is rotatably coupled to the bracket.

In addition to one or more of the features described herein, or as an alternative, in further embodiments the bracket includes a groove and the activation member is receivable within the groove when the bracket is in the first configuration.

In addition to one or more of the features described herein, or as an alternative, in further embodiments the groove is formed at a distal end of the bracket and the groove is coaxial with the second axis.

In addition to one or more of the features described herein, or as an alternative, in further embodiments comprising a biasing mechanism operably coupled to the bracket, the biasing mechanism being operable to apply a biasing force to the bracket to rotate the bracket towards the second configuration.

In addition to one or more of the features described herein, or as an alternative, in further embodiments engagement between the activation member and the bracket opposes the biasing force of the biasing mechanism.

According to an embodiment a method of operating a manual activation system of a fire suppression system includes moving an activation member out of engagement with a bracket. Moving the activation member out of engagement with the bracket enables (i) the bracket to rotate about a first axis from a first configuration to a second configuration and (ii) a pulley coupled to the bracket to move to an active position in response to a tensile force acting on the pulley by a tension member.

In addition to one or more of the features described herein, or as an alternative, in further embodiments moving the activation member out of engagement with the bracket further comprises separating the activation member from a groove formed in the bracket.

In addition to one or more of the features described herein, or as an alternative, in further embodiments the pulley is rotatable about a second axis and the groove is formed a center of the bracket parallel to the second axis.

In addition to one or more of the features described herein, or as an alternative, in further embodiments the activation member further comprises translating the activation member relative to the bracket and a housing.

In addition to one or more of the features described herein, or as an alternative, in further embodiments rotation of the bracket about the first axis occurs at least partially in response to the tensile force acting on the pulley.

In addition to one or more of the features described herein, or as an alternative, in further embodiments a biasing mechanism is operably coupled to the bracket and rotation of the bracket about the first axis occurs at least partially in response to a biasing force of the biasing mechanism.

In addition to one or more of the features described herein, or as an alternative, in further embodiments movement of the pulley to an active position further comprises separating the pulley from the bracket when the bracket is in the second configuration.

According to an embodiment, a fire suppression system includes at least one source of fire suppression agent and a manual activation system coupled to the at least one source of fire suppression agent The manual activation system includes a bracket rotatable about a first axis between a first configuration and a second configuration and a pulley movable between an inactive position and an active position. The pulley is mounted to the bracket and is rotatable about a second axis. A tension member is wrapped about the pulley and has a tensile force acting on the pulley. An activation member is configured to cooperate with the bracket to selectively oppose the tensile force. Fire suppression agent is releasable from the at least one source of fire suppression agent in response to the release of tension in the tension member.

In addition to one or more of the features described herein, or as an alternative, in further embodiments the pulley is mounted concentrically about the bracket.

In addition to one or more of the features described herein, or as an alternative, in further embodiments the bracket includes a groove and the activation member is receivable within the groove when the bracket is in the first configuration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
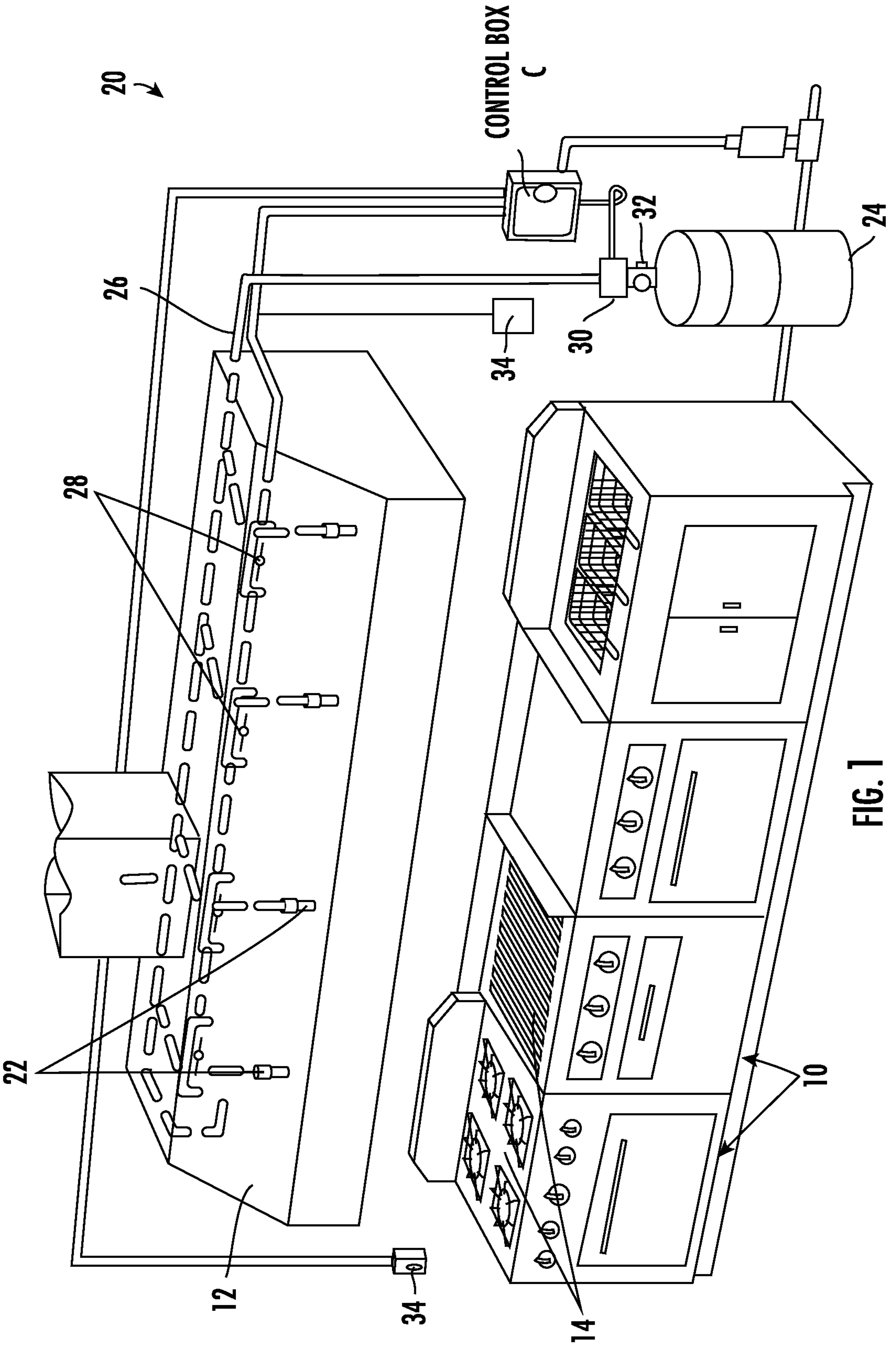
FIG. 1 is a schematic diagram of an exemplary system for delivering a fire suppression agent to at least one cooking appliance according to an embodiment.

With reference now to FIG. 1, an example of a system 20 for delivering a fire suppression agent to one or more cooking appliances 10 is illustrated. The fire suppression system 20 may be located separate or remotely from the cooking appliance 10, such as within a vent hood 12, or alternatively, may be integrated or housed at least partially within a portion of the cooking appliance 10. It should be understood that the configuration of the fire suppression system 20 may vary based on the overall structural design of the cooking appliance 10. The fire suppression system 20 includes one or more spray nozzles 22 associated with the cooking appliance 10 and a source of fire suppression agent 24 in the form of a self-contained pressure vessel. In embodiments including a plurality of cooking appliances 10, one or more spray nozzles 22 may be dedicated to each cooking appliance 10, or alternatively, one or more evenly spaced spray nozzles 22 may be used for all of the cooking appliances 10. The source of fire suppression agent 24 is arranged in fluid communication with the nozzles 22 via an agent delivery path defined by a delivery piping system 26. In the event of a fire, the fire suppression agent is allowed to flow through the delivery piping system 26 to the one or more spray nozzles 22 for release directly onto an adjacent cooking hazard area 14 of the one or more cooking appliances 10.

Those skilled in the art will readily appreciate that the fire suppression agent can be selected from materials such as water, dry chemical agent, wet chemical agent, or the like. Further, the source of fire suppression agent 24 may additionally contain a gas propellant for facilitating the movement of the fire suppression agent through the delivery piping system 26. However, embodiments where the propellant is stored separately from the fire suppression agent are also contemplated herein.

In an embodiment, the fire suppression system 20 is actuated in response to a fire sensing device (illustrated schematically at 28), such as a smoke detector or a heat sensor, for example. In response to detecting heat or smoke exceeding an allowable limit, a control box C will direct a signal to an actuator 30 to open a valve 32 to allow the fire suppression agent to flow from the source 24 to the nozzles 22. Alternatively, or in addition, the fire suppression system 20 includes a manual activation system 34, also referred to herein as a pull station, configured to actuate the control box C to activate the valve 32 to initiate operation of the fire suppression system 20.

Figure 2:
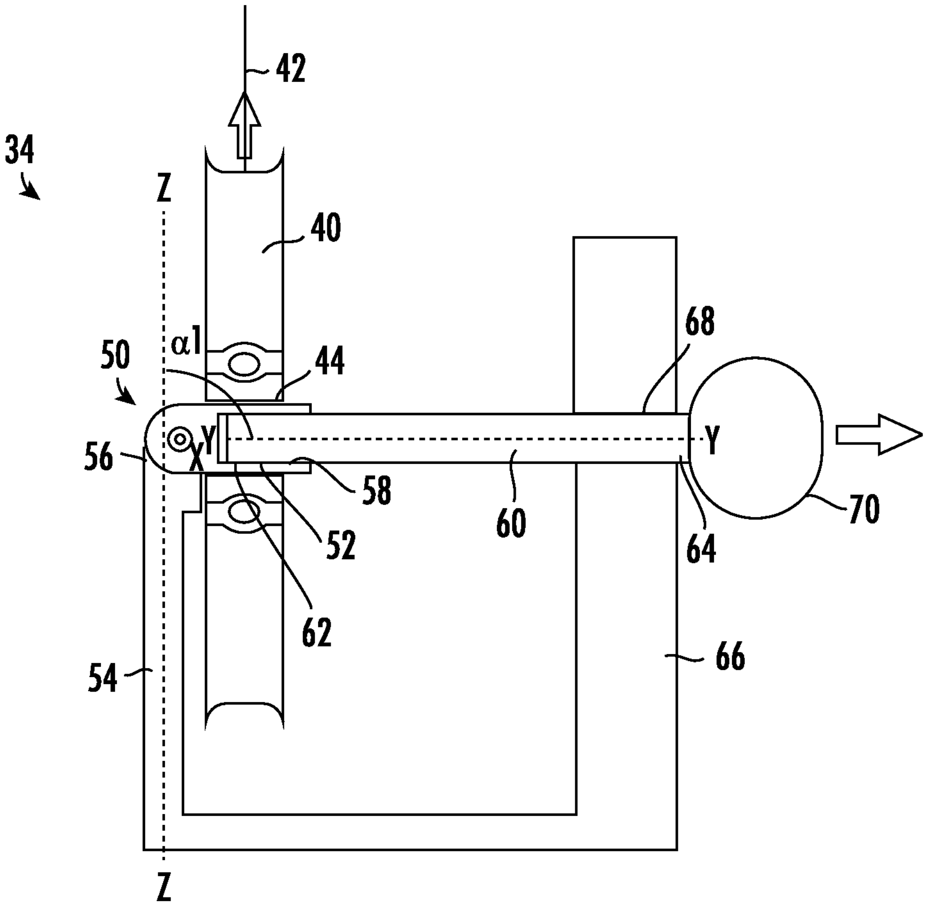
FIG. 2 is a cross-sectional view of an exemplary manual activation system in an inactive position according to an embodiment.
Figure 3:
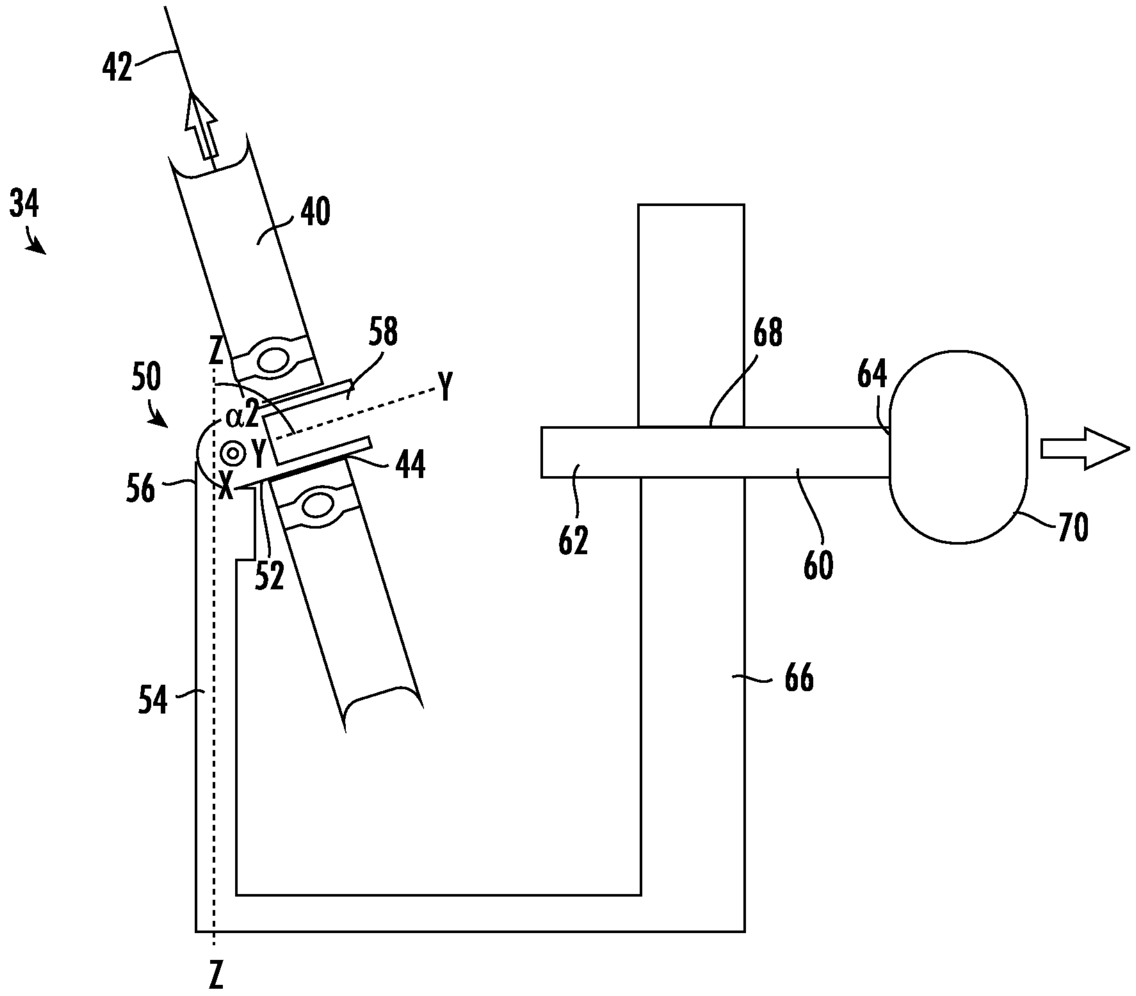
FIG. 3 is a cross-sectional view of the manual activation system of FIG. 2 in an active position according to an embodiment.

With reference now to FIGS. 2-3, an example of a manual activation system 34 is illustrated in more detail. As shown, the manual activation system 34 includes a rotatable pulley 40. A tension member 42, such as a rope or cable, for example, is wrapped about a portion of the pulley 40 and is operably coupled to the control box C of the fire suppression system 20. However, it should be understood that embodiments where the tension member 42 is operably coupled directly to the actuator 30 are also within the scope of the disclosure.

The pulley 40 is movable between an inactive position (FIG. 2) and an active position (FIG. 3). In the inactive position, as shown in FIG. 2, the tension member 42 applies a force (e.g., tension) on the control box C for the fire suppression system 20 to be in an inactive state. When the pulley 40 transforms to an active position, as will be described in more detail below, this tension within the tension member 42, and therefore the force applied in the control box C, is reduced. In response, the control box C will transmit a signal to the actuator 30 to activate the fire suppression system 20. The type of signal transmitted to the actuator 30 may depend on what components within the control box C have been activated. In an embodiment, the reduced tension in the tension member 42 may also be an output of the control box C provided to a downstream component.

The manual activation system 34 additionally includes a mechanical assembly 50 movable between an inactive position and an active position. When in the inactive position, the mechanical assembly 50 is configured to maintain the pulley 40 in an inactive position. In the illustrated, non-limiting embodiment, the mechanical assembly 50 includes a bracket 52, such as mounted at the distal end 56 of a support member 54. The inner diameter of a central hole 44 formed in the pulley 40 may be substantially equal to an outer diameter of the bracket 52 so that the bracket may be received within the opening 44 of the pulley 40. In an embodiment, the pulley 40 is configured to rotate relative to the bracket 52 such that the bracket 52 forms an axle of the pulley 40. However, embodiments where the pulley 40 is rotatably coupled to the bracket 52 are also contemplated herein.

As shown, the bracket 52 may be pivotally or rotatably mounted to the support member 54. The axis of rotation X (first axis) of the bracket 52 may be oriented substantially orthogonally to the axis of rotation Y (second axis) of the pulley 40. The bracket 52 is configured to rotate between a first configuration in which the axis of rotation X of the bracket 52 is arranged at a first angle $\alpha 1$ relative to a longitudinal axis Z of the support member 54 and a second configuration in which the axis of rotation X of bracket 52 is arranged at a second angle $\alpha 2$ relative to the longitudinal axis Z of the support member 54. In the illustrated, non-limiting embodiment, the axis of rotation X of the bracket 52 is arranged generally perpendicular to the longitudinal axis Z of the support member 54 when in the first configuration. However, embodiments where the bracket 52 is arranged at another angle relative to the longitudinal axis Z of the support member 54 are also contemplated herein. In the second configuration, the axis of rotation X of the bracket 52 may be arranged at any angle between the first configuration and an orientation generally parallel to the longitudinal axis Z of the support member. The bracket 52 may be configured to rotate from the first configuration to the second configuration in response to the tension force acting on the pulley 40 via the tension member 42. Alternatively, or in addition, a biasing mechanism (not shown), such as a torsion spring for example, may be operably coupled to the bracket 52. In such embodiments, the biasing force of the biasing mechanism may act on the bracket 52 to bias the bracket 52 into the second configuration.

In an embodiment, the bracket 52 has a groove or hollow region 58 formed therein. In the illustrated, non-limiting embodiment, the groove 58 is illustrated at a center of the bracket 52 and is oriented generally parallel to the axis of rotation Y of the pulley 40. However, embodiments where the groove 58 is formed at another location about the bracket 52, such as at a side or periphery of the bracket 52 for example, are also contemplated herein. When the bracket 52 is in the first configuration, and therefore the mechanical assembly 50 is in the inactive position, the groove 58 is sized to receive and retain an activation member 60 therein, such as a pin for example. As shown, a first end 62 of the activation member 60 is receivable within the groove 58, and a second opposite end 64 of the activation member 60 is exposed at an exterior of the manual activation system 34 for a user to easily grasp and manipulate.

In an embodiment, the activation member 60 extends through an opening 68 formed in a portion of a housing 66 of the manual activation system 34, such as axially aligned with the groove 58. In such embodiments, as shown, the activation member 60 may only be configured to translate parallel to the axis of the opening 68, into and out of the groove 58. As a result, when the first end 62 of the activation member 60 is arranged within the groove 58, this engagement opposes the tension force acting on the pulley 40 by the tension member 42, thereby restricting rotational movement of the bracket 52 about its axis X relative to the support member 54. In embodiments where a biasing mechanism is operably coupled to the bracket 52, the engagement between the activation member 60 and the bracket 52 will oppose the biasing force of the biasing mechanism to retain the bracket in the first configuration. Although the support member 54 is illustrated as being integrally formed with the housing 66, it should be understood that embodiments where the support member 54 is separate from the housing 66 or is coupled to the housing 66 are also within the scope of the disclosure.

To operate the manual activation system 34, a user removes the activation member 60 from the groove 58. This movement transforms the manual activation system 34 from an inactive position to an active position. As previously described and as illustrated in the FIGS., in an embodiment, the activation member 60 is moved laterally (see FIG. 3), out of engagement with the bracket 52. The activation member 60 may have a handle or other feature 70 arranged at the second end 64 thereof to facilitate a user's manipulation of the activation member 60. Upon removing the activation member 60, the tension acting on the pulley 40 will cause the bracket 52 to rotate relative to the support member 54 from the first configuration to the second configuration. In an embodiment, this rotation is sufficient to reduce the tension in the tension member 42. In other embodiments, without the engagement between the activation member 60 and the bracket 52 opposing the tensile force of the tension member 42, not only will the bracket 52 rotate about its axis X, but also, the pulley 40 and the tension member 42 wrapped about the pulley 40 will separate or substantially separate from the bracket 52. Accordingly, once the activation member 60 has separated from the bracket 52, the pulley 40 is free to move from the inactive position to the active position, thereby sending a signal to the control box C via a lack of cable tension.

The mechanical assembly 50 described herein maintains multiple points of contact between the activation member 60 and the bracket 52 until the activation member 60 is completely separated from the bracket 52. By retaining the pulley 40 in the inactive position via the mechanical assembly 50 until the activation member 60 has been completely separate from the bracket 52, the likelihood for the pulley 40 to become twisted or jammed in a partially released state is reduced.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A manual activation system for use in a fire suppression system, the manual activation system comprising:

a bracket rotatable about a first axis between a first configuration and a second configuration;

a pulley movable between an inactive position and an active position, the pulley being mounted concentrically about the bracket and being rotatable about a second axis;

a tension member wrapped about the pulley, the tension member having a tensile force acting on the pulley; and an activation member configured to cooperate with the bracket to selectively oppose the tensile force.

2. The manual activation system of claim 1, wherein the first axis is oriented orthogonally to the second axis.

3. The manual activation system of claim 1, wherein the pulley has a central hole aligned with the second axis, the bracket being receivable within the central hole.

4. The manual activation system of claim 1, wherein the pulley is rotatable about the second axis relative to the bracket.

5. The manual activation system of claim 1, wherein the pulley is rotatably coupled to the bracket.

6. The manual activation system of claim 1, wherein the bracket includes a groove and the activation member is receivable within the groove when the bracket is in the first configuration.

7. The manual activation system of claim 6, wherein the groove is formed at a distal end of the bracket and the groove is coaxial with the second axis.

8. A fire suppression system comprising:

at least one source of fire suppression agent; and a manual activation system coupled to the at least one source of fire suppression agent, the manual activation system comprising:

a bracket rotatable about a first axis between a first configuration and a second configuration;

a pulley movable between an inactive position and an active position, the pulley being mounted concentrically about the bracket and being rotatable about a second axis;

a tension member wrapped about the pulley, the tension member having a tensile force acting on the pulley; and an activation member configured to cooperate with the bracket to selectively oppose the tensile force;

wherein fire suppression agent is releasable from the at least one source of fire suppression agent in response to a release of tension in the tension member.

9. The fire suppression system of claim 8, wherein the bracket includes a groove and the activation member is receivable within the groove when the bracket is in the first configuration.

* * * * *